US008688870B2

(12) United States Patent
Shiba

(10) Patent No.: US 8,688,870 B2
(45) Date of Patent: Apr. 1, 2014

(54) COMBINED WIRELESS AND WIRED ACCESS TO MEMORY UNIT

(75) Inventor: Youichirou Shiba, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 257 days.

(21) Appl. No.: 13/233,249

(22) Filed: Sep. 15, 2011

(65) Prior Publication Data
US 2012/0246416 A1 Sep. 27, 2012

(30) Foreign Application Priority Data

Mar. 23, 2011 (JP) .................................. 2011-065032

(51) Int. Cl.
G06F 3/00 (2006.01)
G06F 13/00 (2006.01)
G06F 3/06 (2006.01)

(52) U.S. Cl.
CPC .................................. G06F 3/0689 (2013.01)
USPC ............................. 710/36; 710/100; 711/100

(58) Field of Classification Search
None
See application file for complete search history.

(56) References Cited

U.S. PATENT DOCUMENTS 7,457,880 B1 11/2008 Kim
2006/0039221 A1 2/2006 Fukuda
2011/0153962 A1* 6/2011 Ozceri et al. .................. 711/155

FOREIGN PATENT DOCUMENTS

JP 2006-216011 8/2006

* cited by examiner

Primary Examiner — Alan Chen
(74) Attorney, Agent, or Firm — White & Case LLP

(57) ABSTRACT

According to one embodiment, a communication device includes a first interface, a wireless communication unit, and a memory unit. The memory unit includes a first region used for first access from the first interface and a second region used for second access from the wireless communication unit. Writing to the second region by the first access and writing to the first region by the second access are inhibited.

18 Claims, 16 Drawing Sheets

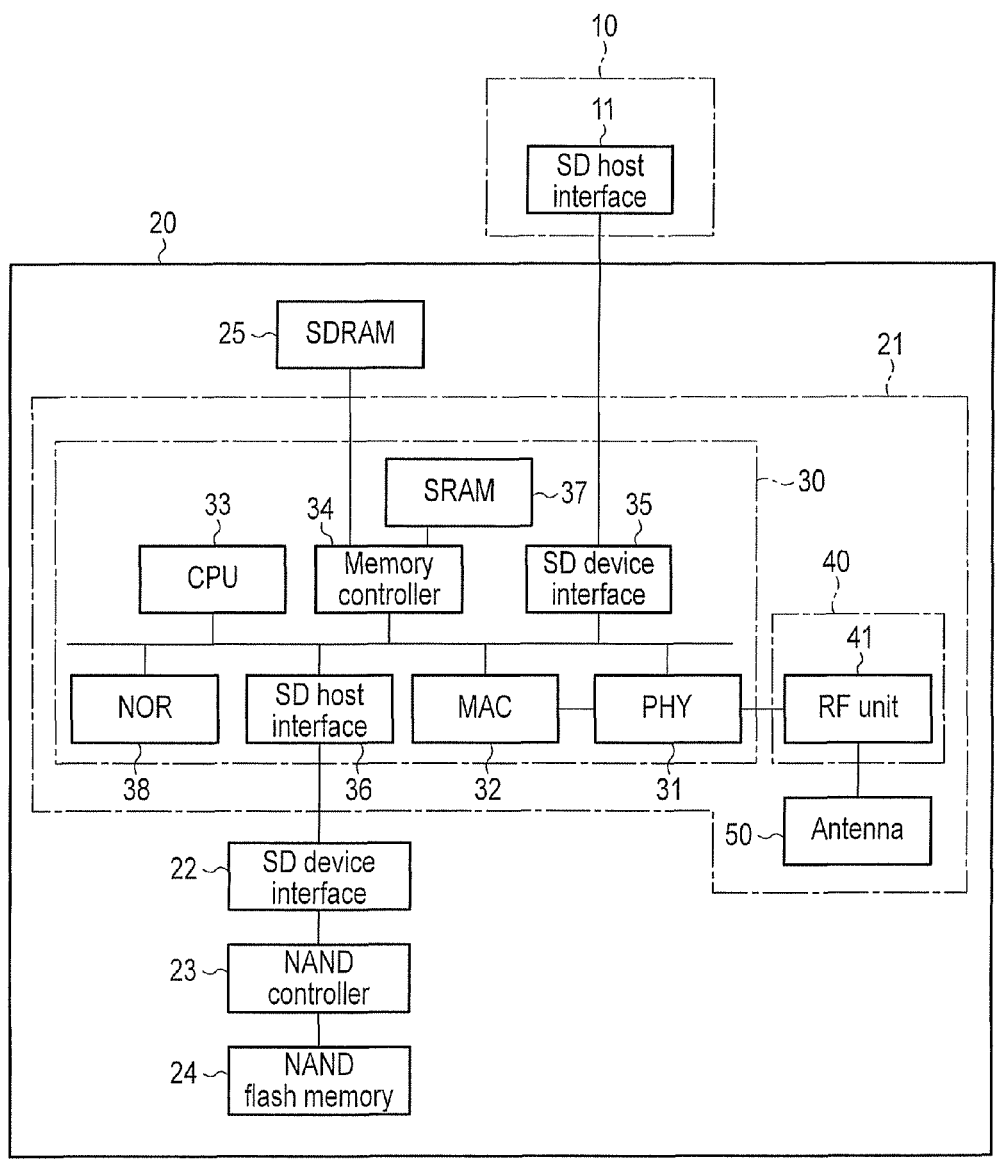
F I G. 2

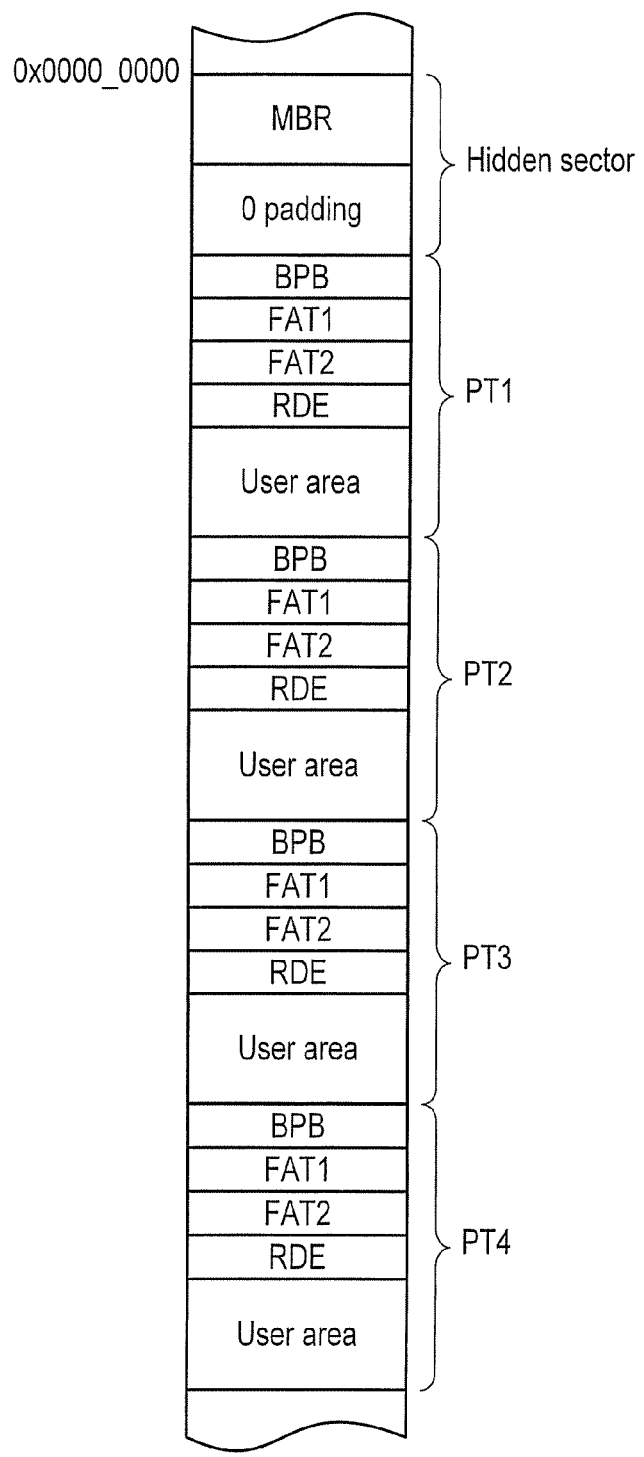
F I G. 3

| Byte \ Byte | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x00000 | | | | | | | | | | | | | | | | |
| ... | | | | | | | | | | | | | | | | |
| 0x01B0 | | | | | | | | | | | | | | | | |
| 0x01B1 | Information of first partition | | | | | | | | | | | | | | | |
| 0x01B2 | Information of second partition | | | | | | | | | | | | | | | |
| 0x01B3 | Information of third partition | | | | | | | | | | | | | | | |
| 0x01B4 | Information of fourth partition | | | | | | | | | | | | | | | |

(Rows 0x00000 through 0x01B0 span: Bootstrap loader. Columns E–F of rows 0x01B1–0x01B4 contain: Information of first/second/third/fourth partition. Last row columns E–F: Signature.)

FIG. 4

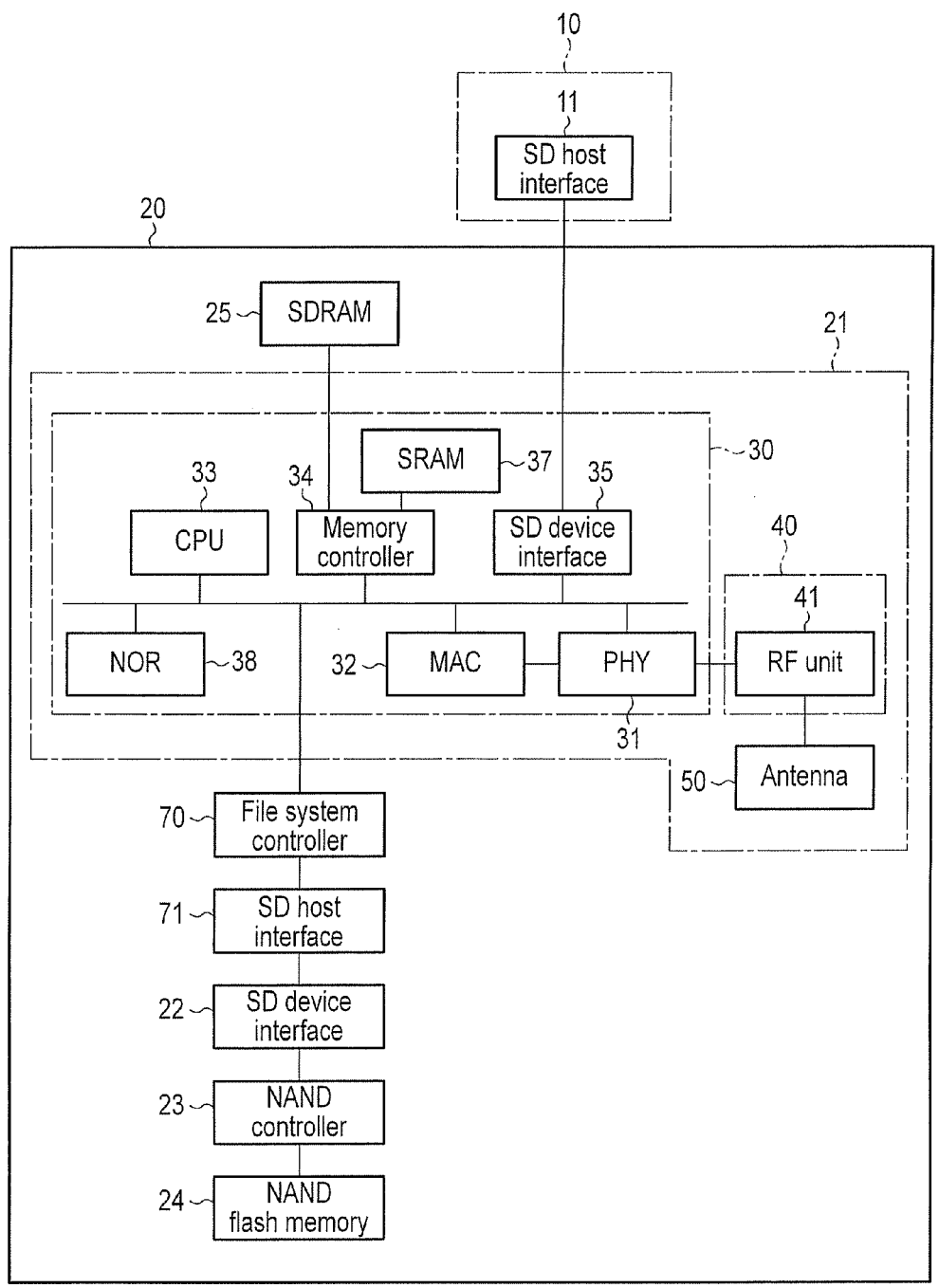
F I G. 9

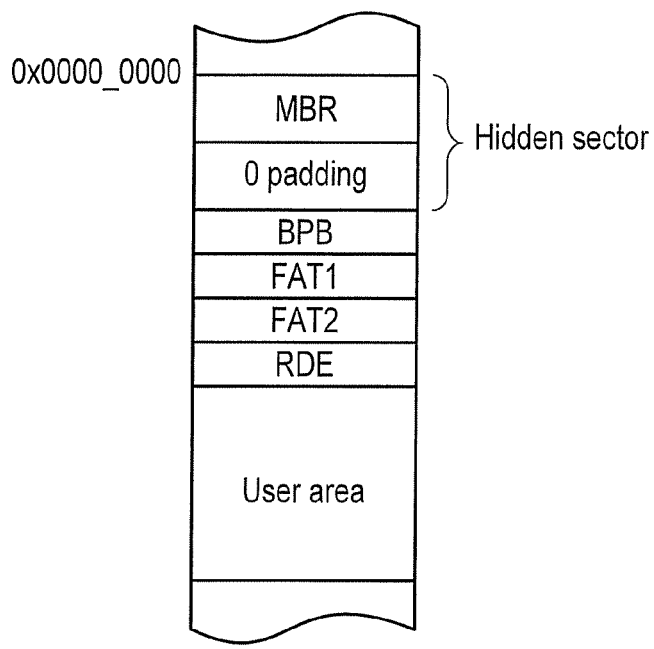
F I G. 10
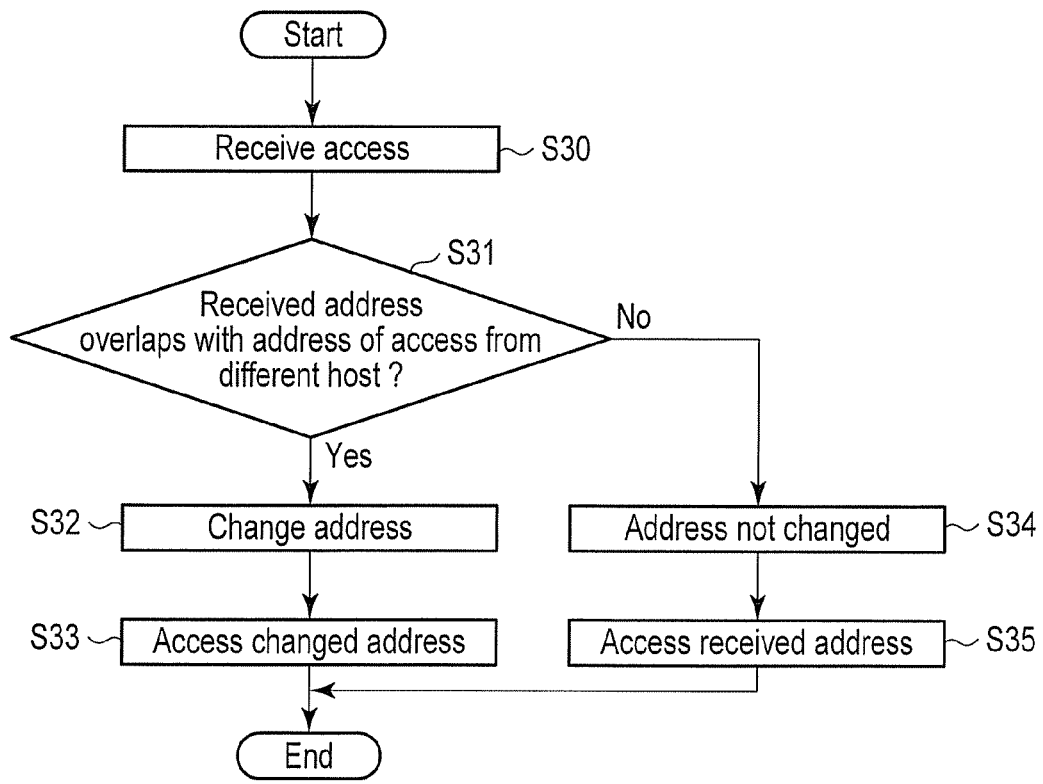
F I G. 11

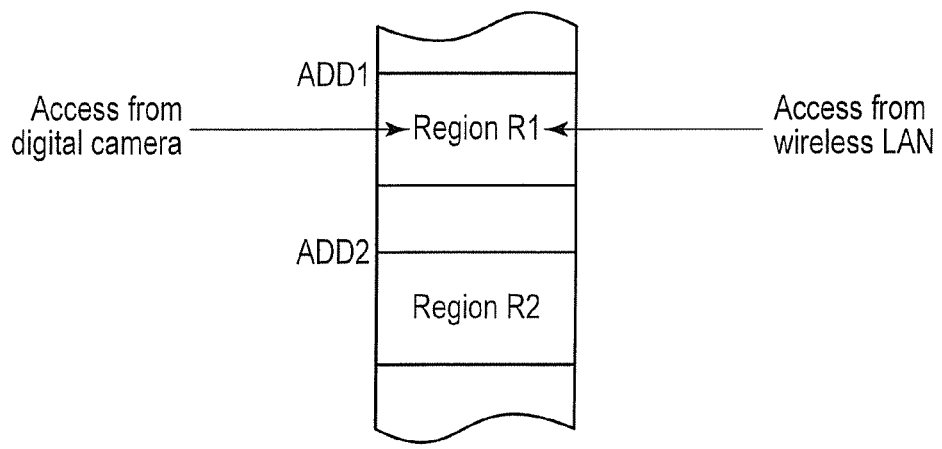
F I G. 12
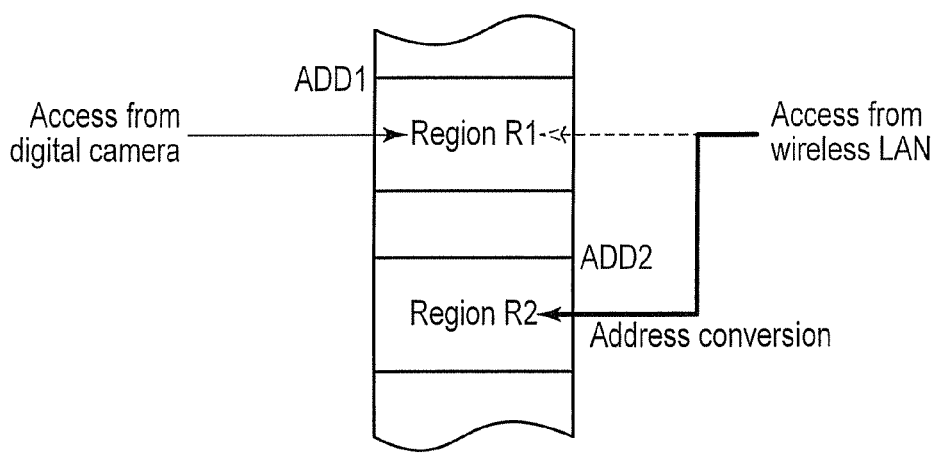
F I G. 13

| Bit Position | 47 | 46 | [45:40] | [39:8] | [7:1] | 0 |
|---|---|---|---|---|---|---|
| Width | 1 | 1 | 6 | 32 | 7 | 1 |
| Value | '0' | '1' | '56' | 0 or 1 | X | '1' |
| Description | Start bit | Transmission bit | Command index | Argument | CRC7 | End bit |

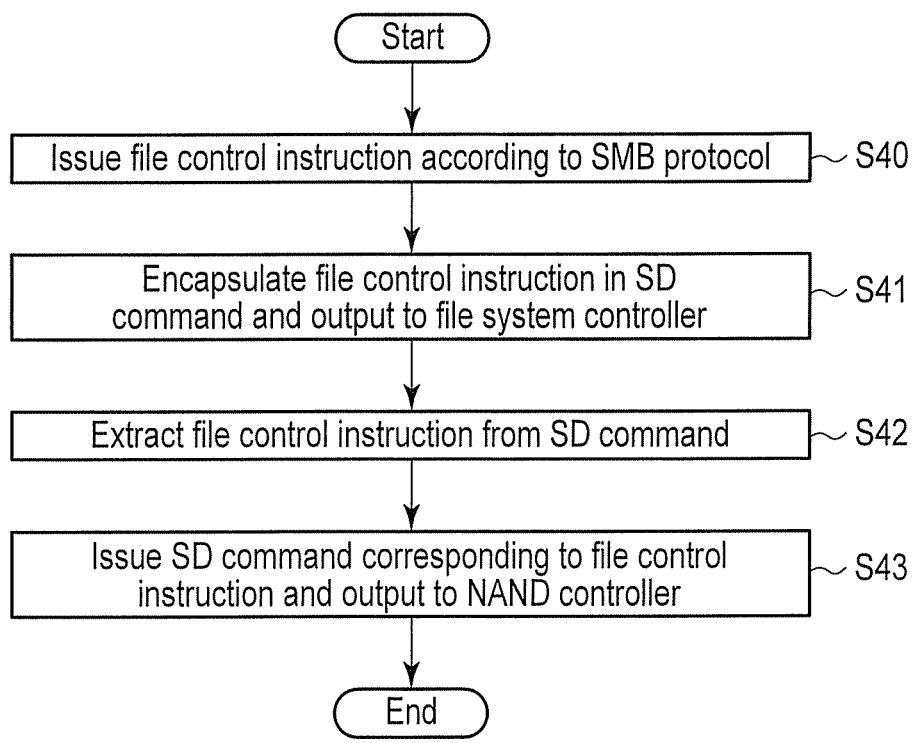
F I G. 16

COMBINED WIRELESS AND WIRED ACCESS TO MEMORY UNIT

CROSS-REFERENCE TO RELATED APPLICATIONS

This application is based upon and claims the benefit of priority from prior Japanese Patent Application No. 2011-065032, filed Mar. 23, 2011, the entire contents of which are incorporated herein by reference.

FIELD

Embodiments described herein relate generally to a communication device and a control method thereof.

BACKGROUND

Conventionally, there is only one host that controls resources. For example, in an SD™ memory card in a digital camera, only the digital camera controls a file in the SD memory card.

However, recently, an SD memory card with a wireless LAN function has appeared. In such a memory card, two hosts of the digital camera and wireless LAN function are present in the SD memory unit. If the two hosts simultaneously access the file of the SD memory unit, a file management table is simultaneously changed and the file may be destroyed.

Therefore, in order to prevent a plurality of hosts from simultaneously accessing the SD memory unit, an exclusive control operation is performed according to an OS of the digital camera. As a result, the host that accesses the SD memory unit is limited to one of the hosts.

However, with the above configuration, the file can be prevented from being destroyed, but the usability of the SD memory card is extremely degraded.

BRIEF DESCRIPTION OF THE DRAWINGS

FIG. 1 and FIG. 2 are block diagrams of a memory card according to a first embodiment;

FIG. 3 is a conceptual diagram showing a memory space of a NAND flash memory according to the first embodiment;

FIG. 4 is a schematic diagram of a master boot record according to the first embodiment;

FIG. 8 and FIG. 9 are block diagrams of a memory card according to a second embodiment;

FIG. 10 is a conceptual diagram showing a memory space of a NAND flash memory according to the second embodiment;

FIG. 11 is a flowchart for illustrating the operation of a file system controller according to the second embodiment;

FIG. 12 and FIG. 13 are conceptual diagrams of a memory space of a NAND flash memory according to the second embodiment;

FIG. 16 is a flowchart for illustrating the operation of a memory card according to the third embodiment;

DETAILED DESCRIPTION

In general, according to one embodiment, a communication device includes a first interface; a wireless communication unit; and a memory unit. The memory unit includes a first region used for first access from the first interface and a second region used for second access from the wireless communication unit. Writing to the second region by the first access and writing to the first region by the second access are inhibited.

[First Embodiment]

A communication device according to a first embodiment and a control method thereof are explained below by taking an SD memory card as an example.

Figure 1:
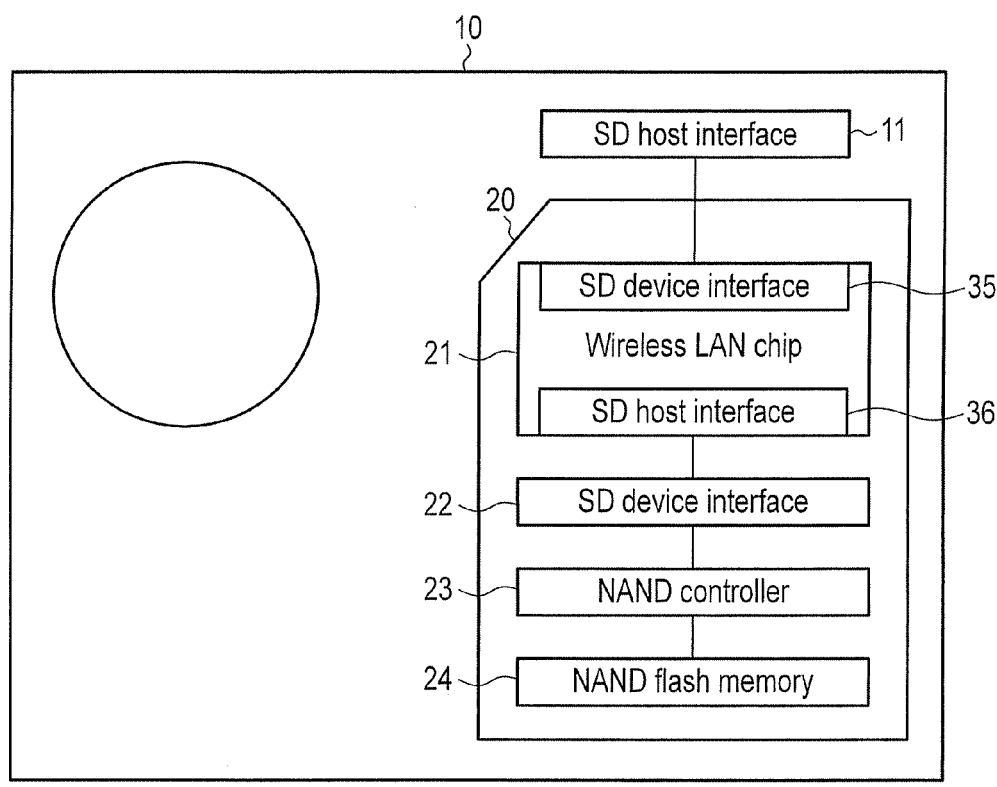

1. Configuration:

1.1 Digital Camera:

FIG. 1 is a block diagram showing an SD memory card (hereinafter simply referred to as a memory card) according to the present embodiment and a digital camera having the SD memory card inserted therein.

As shown in the drawing, a digital camera 10 includes an SD memory card 20. The memory card 20 is inserted into, for example, a card slot formed in the digital camera 10 and wire-connected to an SD host interface 11 of the digital camera 10. The SD host interface 11 controls communication between the digital camera 10 and the SD memory card 20. The digital camera 10 communicates with the SD memory card 20 via the SD host interface 11.

1.2 Memory Card:

The memory card 20 operates using a power source voltage supplied from the digital camera 10 via the SD host interface 11. The memory card 20 is explained in detail with reference to FIG. 1 and FIG. 2. FIG. 2 is a block diagram of the memory card 20.

As shown in the drawing, the memory card 20 includes a wireless LAN chip 21, SD device interface 22, NAND controller 23 and NAND flash memory 24.

The NAND flash memory 24 stores data in a nonvolatile fashion.

The NAND controller 23 controls the operation of the NAND flash memory. That is, the controller performs write, read and erase operations with respect to the NAND flash memory 24.

The SD device interface 22 controls communication with the wireless LAN chip 21. That is, the SD device interface 22 transfers various instructions and data from the wireless LAN chip 21 to the NAND controller 23 and transfers various instructions and data from the NAND controller 23 to the wireless LAN chip.

The wireless LAN chip 21 roughly includes a baseband chip 30, radio-frequency (RF) chip 40 and antenna 50. The baseband chip 30 performs a baseband process for data transferred by wireless LAN communication and issues an instruction and data to the NAND controller 23. The RF chip 40 processes analog data transferred by wireless LAN communication. The antenna 50 receives and transmits data. The above units are explained below.

The RF chip 40 includes an RF unit 41. The RF unit 41 transfers a signal of a high-frequency band used when communicating a wireless transmission channel and amplifies analog reception/transmission data, for example. Then, the unit transmits or receives data via the antenna 50. For example, the RF unit 41 is formed on the RF chip 40 different from the baseband chip 30.

The baseband chip 30 includes a physical unit 31, medium access controller (MAC) unit 32, central processing unit (CPU) 33, memory controller 34, SD device interface 35, SD host interface 36, SRAM 37 and NOR flash memory 38. The above units are formed on the same substrate.

The physical unit 31 performs a process for the physical layer of transmission data and reception data of wireless LAN communication. That is, the physical unit 31 digitizes a reception signal (analog signal) given from the RF unit 40 to obtain a digital signal at the reception time of a frame by means of a wireless LAN. Further, the unit performs a demodulation process for the digital signal. That is, for example, the unit performs an orthogonal frequency division multiplexing (OFDM) demodulation process and error correction decoding process to obtain a reception frame. Then, the thus obtained reception frame is output to the MAC unit 32.

On the other hand, the physical unit 31 receives a transmission frame from the MAC unit 32 at the frame transmission time. Then, the unit performs a redundancy-coding process, OFDM modulation process, and a digital-to-analog conversion process for the received transmission frame to obtain an analog signal. The analog signal is output to the RF chip 40 as a transmission signal. Then, the transmission frame is wireless-transmitted from the RF chip 40 via the antenna 50.

The MAC unit 32 performs a process for the MAC layer of transmission data and reception data of wireless LAN communication. That is, the MAC unit 32 receives a reception frame from the physical unit 31 at the frame reception time. Then, the unit removes a MAC header from the reception frame to assemble a packet. The packet is obtained by assembling transmission/reception data with a data structure that can be dealt with by a personal computer or the like and the frame is transmission/reception data assembled to be communicable via wireless communication. The unit receives a packet from the CPU 33 or the SD host interface 11 of the digital camera 10 at the frame transmission time. Then, a MAC header is attached to the packet to assemble a transmission frame and the result is output to the physical unit 31.

The CPU 33 executes an operating system (OS) to control the whole operation of the wireless LAN chip 21. The CPU 33 performs a process for transmission data and reception data by means of a wireless LAN. Further, the unit performs a process for writing data received via the wireless LAN in the NAND flash memory 24 and a process for reading data to be transmitted via wireless LAN communication from the NAND flash memory 24 and transmitting the same.

The memory controller 34 controls accesses to the SRAM 37 and other memories (for example, synchronous DRAM [SDRAM] 25).

The SRAM 37 and SDRAM 25 hold reception data and transmission data. The memories may have configurations to hold the above data and may be other semiconductor memories or may be storage devices such as hard disk other than the semiconductor memories.

The NOR flash memory 38 stores data in a nonvolatile fashion and holds an OS executed by the CPU 33, for example.

The SD device interface 35 controls communication with the digital camera 10. That is, the SD device interface 35 receives various instructions and data from the SD host interface 11 of the digital camera 10 and transfers necessary data to the SD host interface 11.

The SD host interface 36 controls communication with the NAND flash memory 24. That is, the SD host interface 36 transfers various instructions and data to the SD device interface 22 and receives necessary data from the SD device interface 22.

With the above configuration, image data and video data transferred from the digital camera 10 to the memory card 20 are stored in the SRAM 37 and SDRAM 25 via the SD host interface 11 and SD device interface 35. As described before, accesses to the SRAM 37 and SDRAM 25 are made via the memory controller 34.

Two transfer destinations of data stored in the SRAM 37 and SDRAM 25 are provided. One of them is an external terminal (a communication device such as a cellular phone, PDA or PC having a wireless LAN communication function) that is a connection destination of the wireless LAN and the other one is a NAND flash memory 24 embedded in the memory card 20.

When data is transferred to the external terminal via a wireless LAN, data is processed by the CPU 33 and then output to the RF unit 41 via the MAC unit 32 and physical unit 31. The data is finally transferred to the antenna 50 from the RF unit 41 and transmitted as a wireless LAN frame. When data is received from the external terminal, the process is performed in a reverse order with respect to the above process.

Further, when data is transferred to the NAND flash memory 24, data is processed by the CPU 33 and then transferred to the NAND controller 23 via the SD host interface 36 and SD device interface 22. The NAND controller 23 converts the received address from a logical address to a physical address and writes data in the NAND flash memory 24. When data is read from the NAND flash memory 24, the process is performed in a reverse order with respect to the above process.

The process required for wireless LAN communication can be performed by either software or hardware. If the process is performed by hardware, the function is performed by the MAC unit 32 and physical unit 31 and if the process is performed by software, the function is performed by the CPU 33.

2. Management Method of NAND Flash Memory 24:

Next, the management method of the NAND flash memory 24 is explained with reference to FIG. 3. FIG. 3 is a conceptual diagram showing a memory space of the NAND flash memory 24. In this example, a case wherein the management is made by use of a file allocation table (FAT) file system is explained.

As shown in the drawing, the memory space of the NAND flash memory 24 roughly includes a master boot record (MBR) and a plurality of partitions (in this example, four) PT1 to PT4.

For example, the MBR has the size of 512 bytes and holds information relating to four partitions PT1 to PT4. More specifically, information indicating that the NAND flash memory 24 is divided into four partitions PT1 to PT4 and information of head cluster numbers of partitions PT1 to PT4 (in other words, head addresses of partitions PT1 to PT4) are held. A region in which "0" data is written ("0"-padding) is provided between the MBR and partition PT1. The above region and MBR are hidden sectors and invisible from the user.

Each of partitions PT1 to PT4 includes a BIOS parameter block (BPB), FAT1, FAT2, root directory entry (RDE) and user area.

The BPB holds information indicating the number of bytes configuring one sector, the number of sectors configuring one cluster, the number of sectors of FAT1, FAT2, the number of entries (the number of sectors) of RDE and the like. The size of the BPB is defined as 512 bytes based on the FAT standard. The BPB is provided in the head region of each of partitions PT1 to PT4. Therefore, the location (the head sector number) of the BPB can be understood based on the head cluster number of each of partitions PT1 to PT4 held in the MBR.

FAT1 holds information indicating which one of the clusters is being used, which one of the clusters is not being used and information on a cluster chain. That is, the memory space is a set of spaces with constant size called clusters. When the size of to-be-written data (file) is larger than the cluster size, data is divided in the cluster unit and stored. At this time, the clusters in which data is written may not be continuous in some cases. That is, one data is stored in a plurality of clusters that are separated. At this time, management data used for managing the clusters in which divided data items are written (cluster chain) is stored in the FAT. FAT1 is stored in an address region that is continuous to the BPB. Therefore, the location and size of FAT1 can be understood based on information of the BPB.

FAT2 is a backup of FAT1. Files that are destroyed can be detected based on FAT1 and FAT2. FAT2 is stored in an address region that is continuous to FAT1. Therefore, the location and size of FAT2 can also be understood based on information of the BPB.

RDE holds information on the file and directory in the root directory. That is, RDE includes a plurality of entries and holds information of the name, head cluster, attribute, formation time, file size and the like of the file and directory on the root directory in each entry. RDE is stored in an address region that is continuous to FAT2. Therefore, the location and size of RDE can also be understood based on information of the BPB.

The BPB, FAT1, FAT2 and RDE can be referred to as management information for the FAT file system. The management information of each of partitions PT1 to PT4 is used to manage information of the user area of each of partitions PT1 to PT4.

The user area is an area to hold net user data and a subdirectory is also provided in the user area.

FIG. 4 is a schematic diagram showing the configuration of the MBR. As shown in the drawing, a bootstrap loader is stored in the first region of the MBR and information of partitions PT1 to PT4 (head cluster numbers or the like) and signature are stored following after the above loader.

3. Operation:

Next, the operations of the digital camera 10 and wireless LAN chip 21 with the above configuration are explained.

Figure 5:
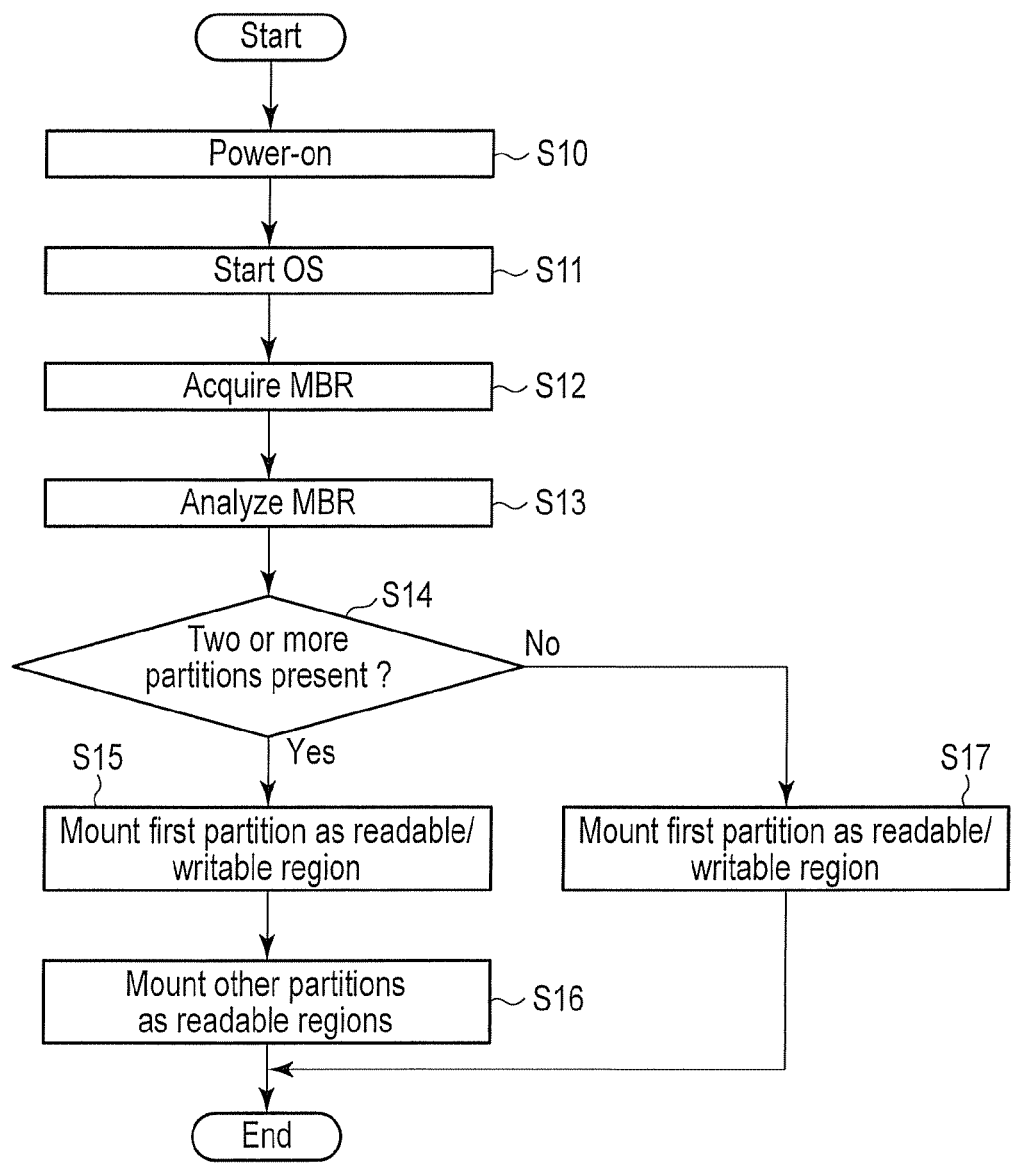
FIG. 5 and FIG. 6 are flowcharts for illustrating the operations of a digital camera and wireless communication unit according to the first embodiment.

3.1 Operation of Digital Camera 10:

First, the operation of the digital camera 10 is explained with reference to FIG. 5. FIG. 5 is a flowchart for illustrating the operation when the digital camera 10 utilizes the NAND flash memory 24.

First, when the digital camera 10 is powered-on (step S10), the processor in the digital camera 10 reads an OS from the memory in the digital camera 10 and starts up the same (step S11).

The OS executed by the processor in the digital camera 10 accesses the NAND flash memory 24 to read an MBR (step S12) and analyze the same (step S13).

As the result of analysis of the MBR, if it is determined that two or more partitions are provided (YES in step S14), the OS mounts a first partition that is one of the two or more partitions as a readable and writable (and erasable) region (becomes visible) (step S15). The mounting is an operation for recognizing the partition. The other partitions are mounted as regions that can be used only for reading (step S16). For example, in the example shown in FIG. 3 and FIG. 4, the digital camera 10 can freely perform read and write operations (and erase operations) for first partition PT1, but can perform only a read operation for the other second to fourth partitions PT2 to PT4. That is, the digital camera 10 reads a FAT from first partition PT1 and manages first partition PT1 based on the FAT. Then, the digital camera 10 freely accesses first partition PT1 to rewrite the FAT of first partition PT1 according to the access content. However, FATs of the other partitions PT2 to PT4 cannot be rewritten.

On the other hand, only one partition is provided (NO in step S14), the OS mounts the partition as a readable and writable (and erasable) region (step S17).

Figure 6:
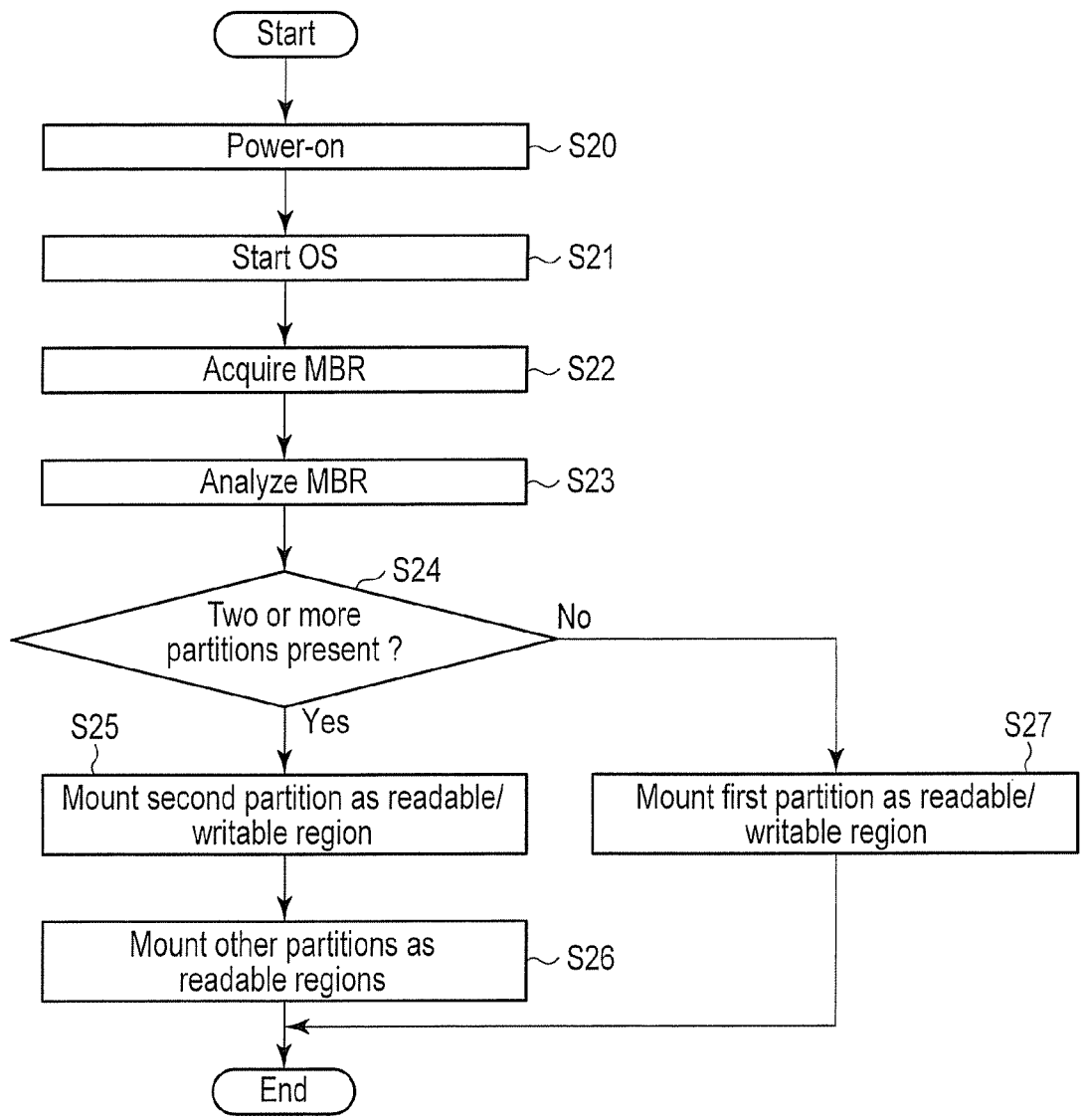

3.2 Operation of Wireless LAN Chip 21:

Next, the operation of the wireless LAN chip 21 is explained with reference to FIG. 6. FIG. 6 is a flowchart for illustrating the operation when the wireless LAN chip 21 utilizes the NAND flash memory 24.

First, when the wireless LAN chip 21 is started up (step S20), the processor (CPU 33) in the wireless LAN chip 21 reads an OS from the NOR flash memory 38, for example, and starts up the same (step S21).

The OS executed by the processor 33 accesses the NAND flash memory 24 to read an MBR (step S22) and analyze the same (step S23).

As the result of analysis of the MBR, if it is determined that two or more partitions are provided (YES in step S24), the OS mounts a second partition that is one of the two or more partitions and is different from the first partition explained in FIG. 5 as a readable and writable (and erasable) region (step S25). Further, the other partitions are mounted as regions that can be used only for reading (step S26). For example, in the example shown in FIG. 3 and FIG. 4, the digital camera 10 can freely perform read and write operations (and erase operations) for second partition PT2, but can perform only a read operation for the other first, third and fourth partitions PT1, PT3 and PT4. That is, the wireless LAN chip 21 reads a FAT from second partition PT2 and manages second partition PT2 based on the FAT. Then, the wireless LAN chip 21 freely accesses second partition PT2 to rewrite the FAT of second partition PT2 according to the access content. However, FATs of the other partitions PT1, PT3 and PT4 cannot be rewritten.

On the other hand, if only one partition is provided (NO in step S24), the OS mounts the partition as a readable and writable (and erasable) region (step S27).

4. Effect of Present Embodiment:

As described above, with the configuration according to this embodiment, the communication device that is highly convenient while protecting the file can be provided. The effect is explained below.

As one example, a method for accessing the SD memory connected to the conventional digital camera is considered. In order to access the SD memory, two methods including a method for accessing via an SD interface with the digital camera used as a host and a method for accessing via a USB interface with the personal computer used as a host are provided. However, the hosts cannot simultaneously access the resource (SD memory). If an attempt is made to simultaneously access the resource, the specification is made to preferentially deal with access from the personal computer and inhibit access from the digital camera.

The reason why the exclusive control operation is provided is to protect a file management table (FAT1, FAT2 regions of the FAT file system) that manages the storage location of the file. It is now supposed that the digital camera and personal computer can simultaneously access the SD memory. Then, the OS installed in the digital camera and the OS installed in the personal computer separately acquire file management tables and hold the same. That is, file management tables having different contents are formed on the respective OSs. Assume that the respective hosts write the file management tables in the SD memory in this state, one of the host (for example, the personal computer) firstly writes the file management table to the SD memory card. After that, another host (for example, the digital camera) writes the file management table to the SD memory card. In this case, the information on the personal computer is overwritten with the information on the digital camera. In other words, the information (file management table) for the digital camera becomes valid and the information (file management table) for the personal computer becomes invalid.

A case of the SD memory card having the wireless LAN chip mounted thereon is considered. The digital camera having such an SD memory card inserted therein can not only take photographs but also receive photographs from a different terminal via a wireless LAN. That is, two hosts are provided in the SD memory. If two different hosts (digital camera and wireless LAN) perform the file operation with respect to one SD memory, inconsistency occurs in the file management tables.

The reason why the above problem occurs is the same as that occurring in a case of the relationship between the digital camera and the personal computer. That is, this is because the two hosts separately control the file system for the NAND flash memory that is a data storage region of the SD memory card.

More specifically, the OS in the wireless LAN chip and the OS in the digital camera respectively acquire FAT regions configuring a FAT 16 and FAT 32 that are file systems of the SD memory card. Then, the OSs update the FAT regions and write back the contents into the NAND flash memory after updating. As a result, only the newest file management table for one of the hosts becomes effective and file information written by another host before the newest management table is written is overwritten and is made invalid.

In order to solve the above problem, a method for limiting the write operation from the digital camera while the wireless LAN is performing a write operation is considered. However, with this method, the photographing operation by the camera cannot be performed in a period in which, for example, a huge video data is transferred from the wireless LAN. That is, the user waits until the file transferring operation by the wireless LAN is terminated. Therefore, with this method, the file transferring operation by the wireless LAN can be performed, but there occurs a problem that the photographing operation cannot be performed during the above period and the usability of the memory card is significantly degraded.

In this respect, with the configuration according to the present embodiment, the NAND flash memory 24 of the SD memory card 20 is previously divided into a plurality of partitions PT1 to PT4 (see FIG. 3). Then, FATs are prepared for the respective partitions and information thereof is stored in the MBR. Further, different partitions are allocated to the respective hosts for writing.

As a result, the respective hosts recognize that the NAND flash memory 24 is divided into a plurality of regions. Then, each host holds the FAT for the allocated partition and can perform a write operation with respect to only the allocated partition.

For example, in FIG. 3, it is supposed that first partition PT1 is allocated to the digital camera 10 and second partition PT2 is allocated to the wireless LAN chip 21. Then, the digital camera 10 recognizes the presence of first to fourth partitions PT1 to PT4 and can read data from the above regions. However, the camera can perform the write operation (and erase operation) only for first partition PT1. Further, the wireless LAN chip 21 can read data from first to fourth partitions PT1 to PT4, but can perform only the write operation (and erase operation) only for second partition PT2.

Therefore, information (FAT) recorded by the digital camera 10 can be suppressed from being rewritten by the wireless LAN chip 21 and information (FAT) recorded by the wireless LAN chip 21 can be suppressed from being rewritten by the digital camera 10.

Thus, the regions that can be operated by the respective hosts can be clearly distinguished by previously dividing the resource into a plurality of regions. Then, according to the present method, the write operations to the same address by the plurality of hosts will not occur. As a result, there occurs no possibility that the file system is destroyed and the file can be safely operated on while accesses from the plurality of hosts are permitted.

In this embodiment, a case wherein the four partitions are provided is explained. However, the number of partitions is not limited to four and it is sufficient if partitions of a number corresponding to at least the number of hosts are provided.

Figure 7:
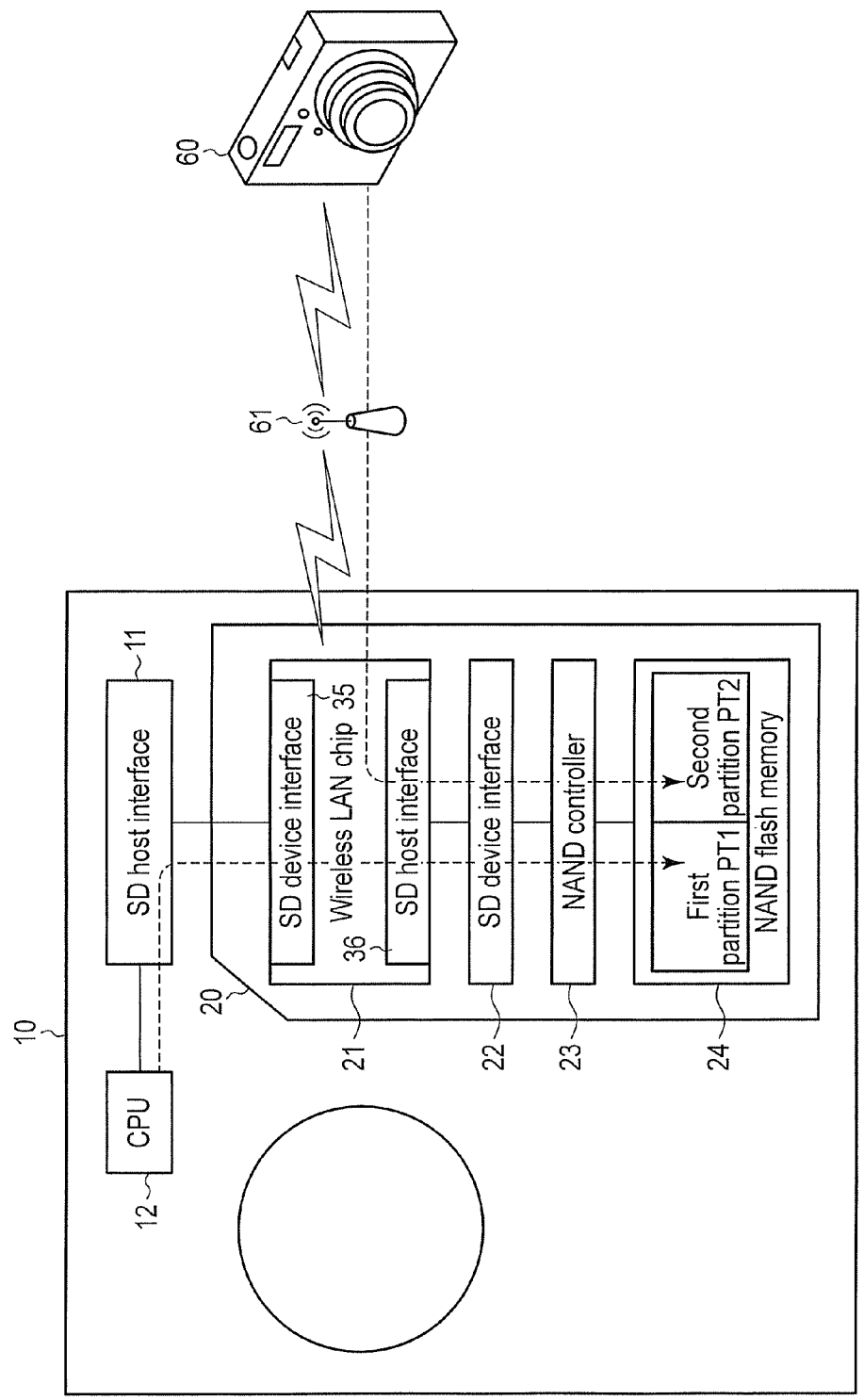
FIG. 7 is a schematic diagram of wireless communication according to the first embodiment.

FIG. 7 shows a case wherein two partitions are provided. As shown in the drawing, the CPU 12 of the digital camera 10 holds a FAT of first partition PT1 and write access of the digital camera 10 is permitted only to first partition PT1. Further, a different digital camera 60 connected thereto via an access point 61 holds a FAT of second partition PT2 and write access of the digital camera 60 is permitted only to second partition PT2.

[Second Embodiment]

Next, a communication device according to a second embodiment and a control method thereof are explained. Unlike the first embodiment, in this embodiment, files are protected by address conversion without dividing the NAND flash memory 24 into a plurality of regions. In the following description, only a portion different from that of the first embodiment is explained.

Figure 8:
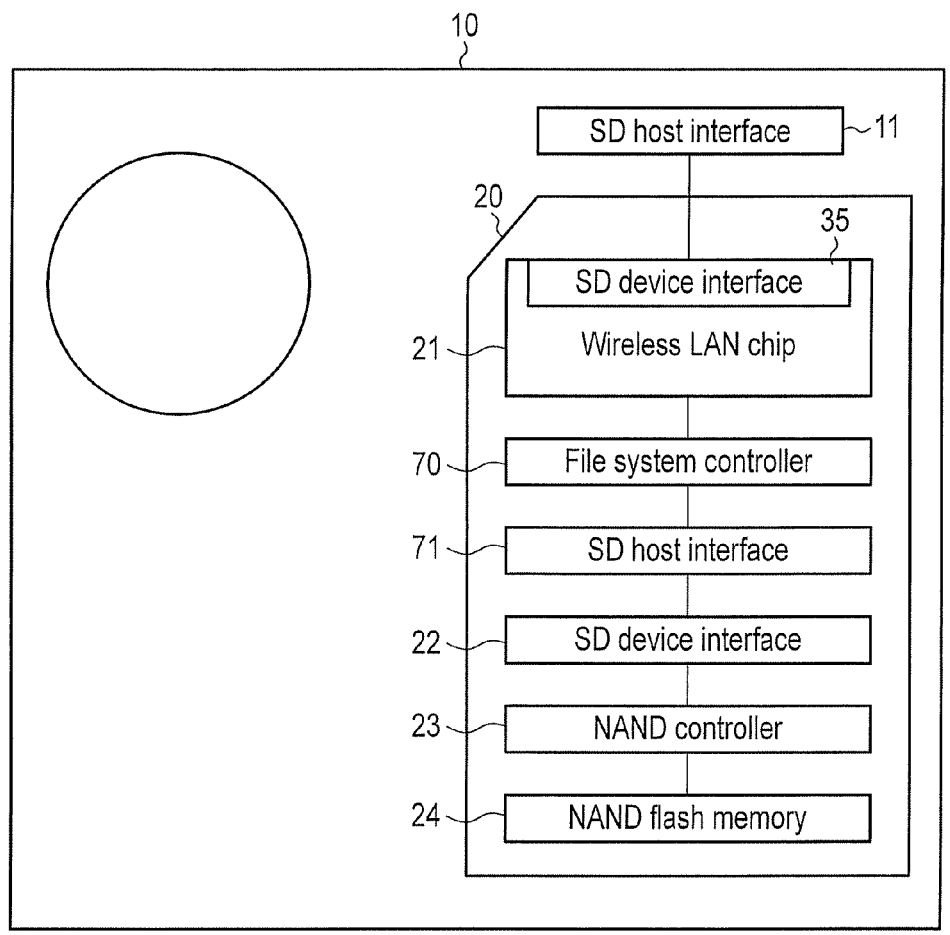

1. Configuration:

FIG. 8 is a block diagram showing a memory card according to the present embodiment and a digital camera having the SD memory card inserted therein. FIG. 9 is a block diagram showing the memory card more in detail.

As shown in the drawing, a memory card 20 according to the present embodiment is obtained by newly providing a file system controller 70 and SD host interface 71 and omitting the SD host interface 36 of the wireless LAN chip 21 in the configuration explained in the first embodiment.

The file system controller 70 receives accesses to the NAND flash memory 24 from the digital camera 10 and wireless LAN chip 21. Then, the controller performs address conversion as required and outputs the address and data to a NAND controller 23 via the SD host interface 71 and SD device interface 22. More specifically, if write instructions are simultaneously supplied to the same address from both of the digital camera 10 and wireless LAN chip 21, one of the addresses is converted to a different address. Further, when a write instruction is issued to an address in which one of data items of the digital camera 10 and wireless LAN chip 21 is held from the other unit, an address corresponding to the write instruction is converted to a different address.

2. Memory Space of NAND Flash Memory 24:

Next, the memory space of the NAND flash memory 24 is explained with reference to FIG. 10. FIG. 10 is a conceptual diagram showing the memory space of the NAND flash memory 24.

As shown in the drawing, in this embodiment, the memory space of the NAND flash memory 24 is managed by one FAT (FAT1, FAT2) without being divided into a plurality of partitions. That is, data from the digital camera 10 and data from the wireless LAN chip 21 are both managed by the same FAT.

3. Operation:

Next, the operation of the memory card 20 according to this embodiment is explained with reference to FIG. 11. FIG. 11 is a flowchart for mainly illustrating the operation of, particularly, the file system controller 70 when write access is issued to the NAND flash memory 24.

As shown in the drawing, when the file system controller 70 receives write access from the digital camera 10 and/or wireless LAN chip 21 (step S30), the file system controller 70 determines whether or not the address overlaps with that of access from the different host (step S31).

A case wherein the address is overlapped corresponds to a case wherein write accesses are simultaneously made from both of the digital camera 10 and wireless LAN chip 21, for example, or a case wherein write access is made to a region in which data from one of the digital camera 10 and wireless LAN chip 21 is held from the other unit. In the latter case, it can be determined by referring to the FAT read from the NAND flash memory 24.

When the address is overlapped (YES in step S31), the file system controller 70 converts an address for write access (step S32). Then, a write instruction for the converted address is issued and output to the NAND controller 23 via the SD host interface 71 and SD device interface 22 (step S33).

For Example, if write accesses are simultaneously made to the same address from both of the digital camera 10 and wireless LAN chip 21, the address of write access from at least one of them is converted. If the address of only the access from the wireless LAN chip 21 is converted, a write instruction is issued to the converted address for data from the wireless LAN chip 21. At this time, the address for data from the digital camera 10 is not converted and a write instruction to the address received from the digital camera 10 is issued. The reverse case is also applied. The address conversion may be performed for both of the write accesses depending on the cases.

A case wherein the addresses are not overlapped corresponds to a case wherein write access is simultaneously made to different addresses from both of the digital camera 10 and wireless LAN chip 21, for example, or a case wherein write access is made from one of the digital camera 10 and wireless LAN chip 21 and the address is different from that of a region in which data of the digital camera 10 is held.

In this case (NO in step S31), the file system controller 70 does not perform the address conversion (step S34) and issues write instructions to addresses received from the respective hosts (step S35).

4. Effect of Present Embodiment:

In this embodiment, the same effect as that of the first embodiment can be obtained. That is, with the configuration according to the present embodiment, the memory card 20 includes the file system controller 70. Each host does not include a file system and the file system controller 70 manages the file system. That is, a FAT rewriting operation is performed by the file system controller 70 and not by each host. At this time, the file system controller 70 performs address conversion to prevent the same address region from being accessed when the same address region is accessed from a plurality of hosts.

This situation is shown in FIG. 12 and FIG. 13. FIG. 12 and FIG. 13 are conceptual diagrams of a memory space of the NAND flash memory 24. For example, as shown in FIG. 12, it is assumed that write accesses are simultaneously made to region R1 of address ADD1 from the digital camera 10 and wireless LAN chip 21. Then, as shown in FIG. 13, the file system controller 70 performs address conversion for the write access from one of the hosts (the wireless LAN chip 21 in the example of FIG. 13). As a result, data from the wireless LAN chip 21 is written not in region R1 but in region R2 of address ADD2. Then, the file system controller 70 records the fact that data from the digital camera 10 is present in region R1 and data from the wireless LAN chip 21 is present in region R2 in the FAT.

As described above, the file can be prevented from being destroyed and write accesses from a plurality of hosts can be coped with by managing centrally the FAT by the file system controller 70.

It is not particularly necessary to store the information indicating the data written with address conversion. This is because necessary data can be selected based on the file name by referring to the FAT when the read or erase operation is performed later.

[Third Embodiment]

Next, a communication device according to a third embodiment and a control method thereof are explained. Like the second embodiment, this embodiment relates to an example in which a file system controller is used and an instruction by a protocol different from the SD interface is embedded in an SD command issued from the digital camera 10 and wireless LAN chip 21 in the second embodiment. In the following description, only a portion different from that of the second embodiment is explained.

Figures 14, 15:
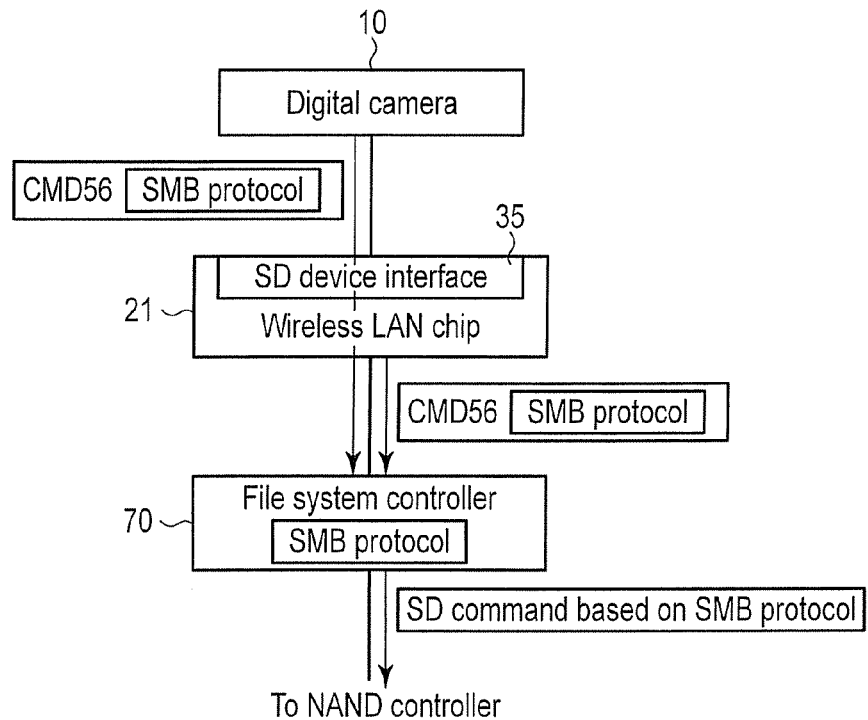
FIG. 14 is a schematic diagram of wireless communication according to a third embodiment.
FIG. 15 is a conceptual diagram showing the configuration of an SD command.

1. Concept of Present Embodiment:

First, the concept of this embodiment is explained with reference to FIG. 14. FIG. 14 is a conceptual diagram showing the state in which write accesses to the digital camera 10 and wireless LAN chip 21 are made.

Like the second embodiment, OSs of the digital camera 10 and wireless LAN chip 21 do not manage the file system. The OSs only output a file control instruction to the file system controller 70. The instruction issued at this time is pursuant to a protocol used for controlling the file such as the Server Message Block (SMB) protocol (RFC 1001, 1002), File Transfer Protocol (FTP) (RFC 697, 959, 1639, 2228, 2389, 2428, 2640, 3659) and Web-based Distributed Authoring and Versioning (WebDAV) protocol (RFC 2518).

SMB, FTP and WebDAV are originally protocols used by a plurality of hosts over TCP/IP to control files on servers. However, in this embodiment, the exclusive control operation for file access is realized by using the above protocols on the SD interface.

For example, SMB prevents occurrence of inconsistency in the file system by causing the SMB server to manage centrally file systems and controlling the SMB client to issue a file read and write instruction to the server in order to permit the SMB client to access the file provided in the SMB server. Even if instructions of forming files are issued from a plurality of clients, inconsistency does not occur in the file system since an instruction is exclusively controlled on the server side. This also applies to the FAT and WebDAV.

In order to realize the above function on the SD interface, the file system controller 70 acts as the SMB server and the host such as the digital camera 10 or wireless LAN chip 21 acts as the SMB client. Thus, the SMB protocol using the SD interface is realized. Since only the file system controller 70 acting as the SMB server controls the file system, the file system will not be destroyed even if accesses are simultaneously made from a plurality of hosts.

The OSs of the digital camera 10 and wireless LAN chip 21 encapsulate the SMB protocol in a CMD 56 that is one of SD commands to transfer/receive the same to/from the file system controller 70. FIG. 15 is a table showing the configuration of the command CMD 56.

Figure 17:
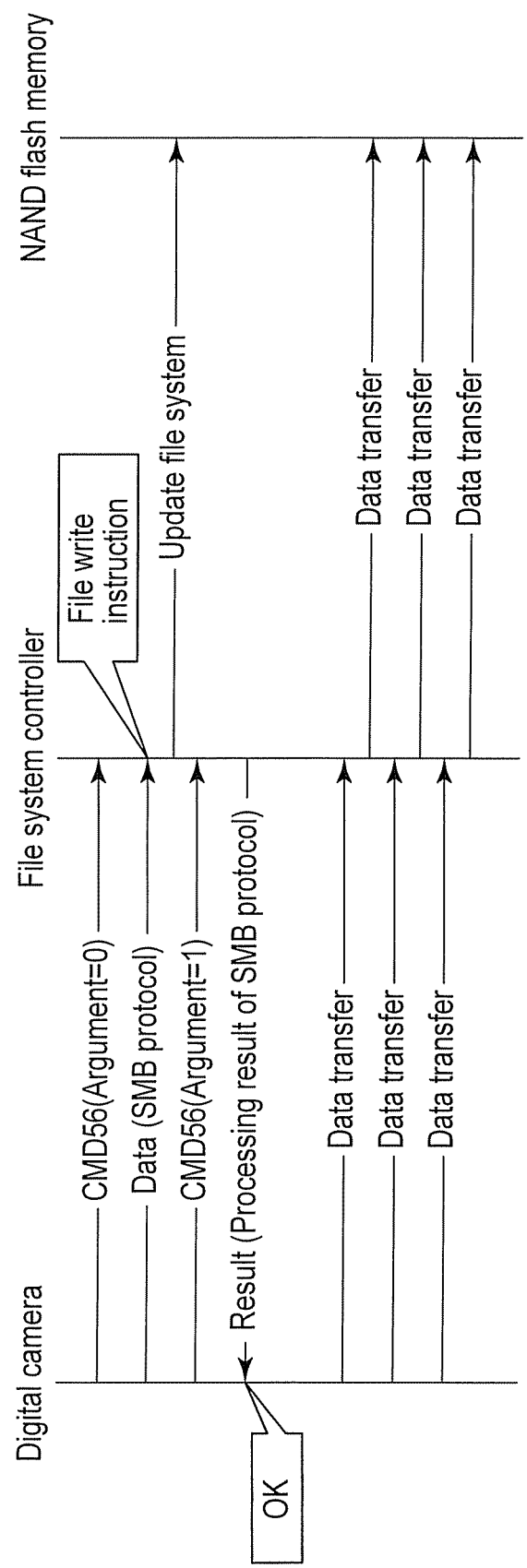
FIG. 17 and FIG. 18 are timing charts showing a write method and read method according to the third embodiment.

The operation of encapsulating the SMB protocol using the CMD 56 is explained. The CMD 56 is a vendor command and is the SD command freely used by the user. With the CMD 56, data transmission or reception is permitted after the command is issued. The operation of encapsulating the SMB protocol in the CMD 56 means that the SMB protocol is transmitted as data following the CMD 56. In FIG. 14, this is conceptually shown. FIG. 17 explained later shows an image when the SMB protocol is encapsulated in the CMD 56 and shows the state in which the host issues an SMB protocol in a data transfer processing unit after the CMD 56 is issued.

As described above, an attempt is made to match the file systems in the file system controller 70.

2. Operation:

Next, the operation of the memory card 20 in the present embodiment is explained.

2.1 Basic Operation:

First, the basic operation is explained with reference to FIG. 16. FIG. 16 is a flowchart roughly showing the flow of the operation for accessing the NAND flash memory 24.

As shown in the drawing, first, the host (the OS of the digital camera 10 and/or wireless LAN chip 21) issues a file control instruction for write, read and erase according to an SMB protocol (step S40). Of course, the same operation can be performed according to the FTP or WebDAV protocol, but a case wherein the operation is performed according to the SMB protocol is explained below as an example.

Subsequently, the host encapsulates the issued file control instruction in the CMD 56 of the SD command, that is, embeds the same in the CMD 56 and transmits the result to the file system controller 70 (step S41).

The file system controller 70 extracts a file control instruction according to the SMB protocol from the received CMD 56 (step S42). Then, the file system controller 70 updates the FAT of the NAND flash memory 24, issues an SD command (such as a CMD 17, CMD 18, CMD 24, CMD 25, CMD 38 or the like) corresponding to the extracted file control instruction and outputs the SD command to the NAND controller 23 via the SD host interface 71 and SD device interface 22 (step S43).

2.2 Concrete Example of Write:

Next, a concrete example of the write operation is explained with reference to FIG. 17.

FIG. 17 is a timing chart showing transmission or reception of a signal when data is written in the NAND flash memory 24 from the digital camera 10. This is also applied to a case where the wireless LAN chip 21 is used as the host.

As shown in the drawing, first, the digital camera 10 issues a CMD 56 and transmits the same to the file system controller 70. At this time, the digital camera 10 sets "0" in the Argument field of the CMD 56. When "0" is set in the Argument field of the CMD 56, it is indicated that a protocol is transmitted from the client (in this example, the digital camera 10) to the server (in this example, the file system controller 70).

Then, the digital camera 10 issues data (write instruction) according to the SMB protocol and transmits the same to the file system controller 70. The file system controller 70 recognizes the write instruction and updates the file system (FAT) read from the NAND flash memory 24.

Further, the digital camera 10 issues a CMD 56 and transmits the same to the file system controller 70. At this time, the digital camera 10 sets "1" in the Argument field of the CMD 56. When "1" is set in the Argument field of the CMD 56, it is indicated that the result indicating that the protocol process is successfully performed or not is acquired on the server side.

The file system controller 70 returns the processing result (for example, whether the file system can be updated or not) of the SMB protocol to the digital camera 10 in response to the CMD 56. If the processing result is correct, the digital camera 10 transfers write data to the file system controller 70 and the file system controller 70 transfers the write data to the NAND flash memory 24.

Figure 18:
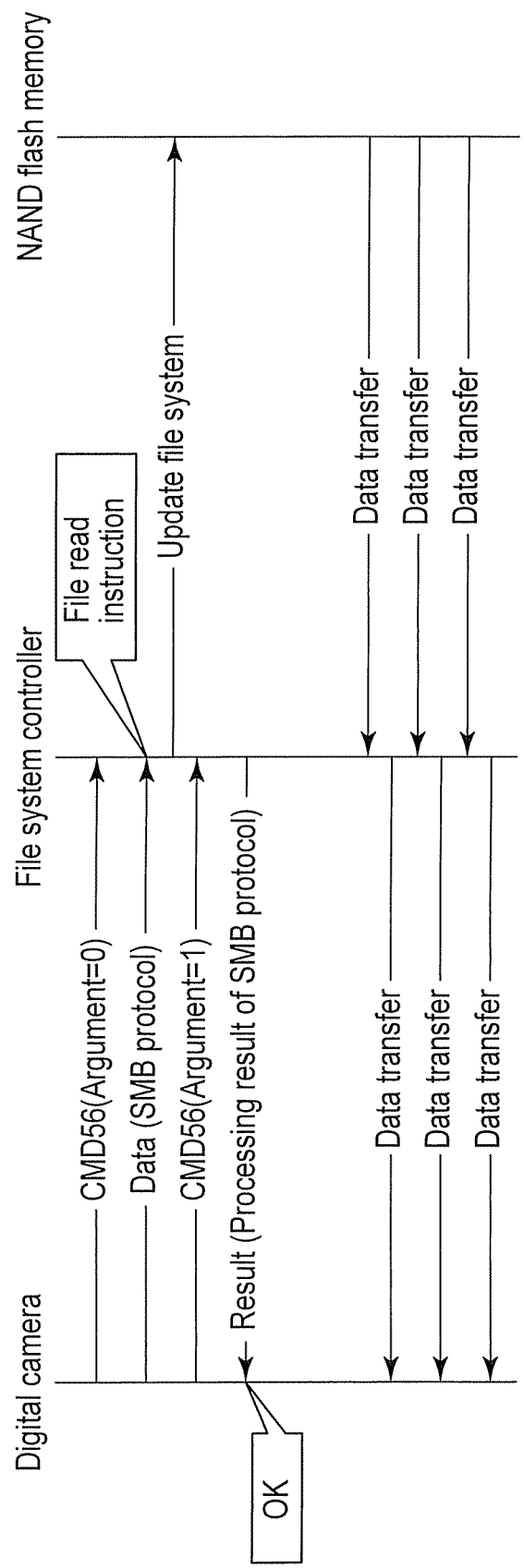

2.3 Concrete Example of Read:

The read operation is basically the same as the write operation. FIG. 18 is a timing chart showing transmission or reception of a signal when data is written in the NAND flash memory 24 from the digital camera 10. This is also applied to a case where the wireless LAN chip 21 is used as the host.

At the read time, a read instruction is issued as an SMB protocol from the digital camera 10. Then, if the SMB protocol can be correctly processed by the file system controller 70, read data is transferred from the NAND flash memory 24 to the file system controller 70 and from the file system controller 70 to the digital camera 10.

3. Effect According to Present Embodiment:

With the configuration according to this embodiment, the same effect as that of the first embodiment can be obtained.

Originally, the protocol such as SMB, FTP or WebDAV is a protocol for the network utilized between machines provided on TCP/IP. In this embodiment, the protocols are utilized between the digital camera 10 and file system controller 70 that are connected via the SD interface and between the wireless LAN chip 21 and file system controller 70. At this time, the digital camera 10 and wireless LAN chip 21 are clients and the file system controller 70 acts as the server.

In the SMB, FTP and WebDAV protocols, TCP/IP is used as a lower-level protocol. However, in this embodiment, the digital camera 10 and wireless LAN chip 21 are connected to each other via the SD interface. Therefore, the CMD 56 of the SD command is used instead of TCP/IP.

The CMD 56 is an SD command permitted to be freely used for each vendor. Then, in this embodiment, the operation of transmitting and receiving a file, acquiring a list of files, moving the file and deleting the file is performed by encapsulating the SMB, FTP and WebDAV protocols in the present command CMD56.

Then, the file system controller 70 analyzes the SMB protocol that is encapsulated in the CMD 56 and controls the NAND flash memory 24 according to the SMB protocol.

Therefore, even if a plurality of hosts simultaneously transmit CMDs 56 including SMB protocols, the protocols are not mixed by the exclusive control operation by the file system controller 70 and inconsistency will not occur in the file system. That is, accesses can be simultaneously made from a plurality of hosts while the file is protected.

[Fourth Embodiment]

Next, a communication device according to a fourth embodiment and a control method thereof are explained. This embodiment relates to an example in which a wireless LAN chip also has a function of the file system controller 70 in the second and third embodiments. In the following description, only a portion different from that of the second and third embodiments is explained.

Figure 19:
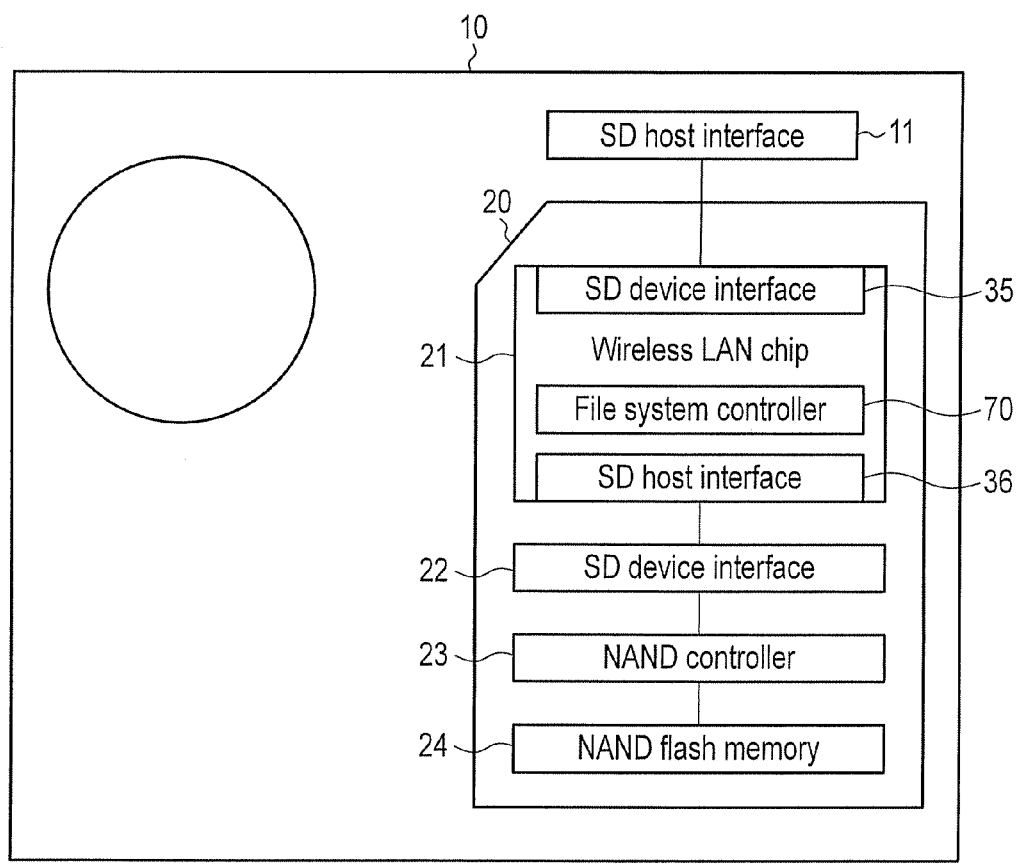
FIG. 19 is a block diagram showing a memory card according to a fourth embodiment.

FIG. 19 is a block diagram showing a memory card according to this embodiment and a digital camera with the memory card inserted therein.

As shown in the drawing, a memory card 20 according to this embodiment is obtained by providing the file system controller 70 explained in the second and third embodiments in the wireless LAN chip 21 in the configuration of FIG. 1 explained in the first embodiment.

Thus, if the host (wireless LAN chip 21) is capable of processing an SMB protocol encapsulated in a CMD 56, the host may perform the function without separately providing the file system controller 70. In this case, the number of chips can be reduced.

[Modification or the Like]

As described above, the communication device 20 according to the above embodiment includes the first interface 35, wireless LAN chip 21 and memory unit 24. The memory unit 24 includes first region PT1 used for first access from the first interface 35 and second region PT2 used for second access from the wireless LAN chip 21. Writing to second region PT2 by the first access and writing to first region PT1 by the second access are inhibited.

As a result, simultaneous accesses from a plurality of hosts are permitted and data can be prevented from being destroyed by writing data in the same region. As a result, the usability of the communication device can be enhanced.

The above embodiment is given only as an example and various modifications can be made. For example, the NAND flash memory 24 may be another flash memory such as a NOR flash memory or may be a semiconductor memory other than the flash memory. Further, in the above embodiment, an example of the card device is explained, but the memory card 20 may be a memory embedded in the host such as the digital camera 10, for example. In addition, the memory card is not limited to a memory corresponding to the SD interface.

Further, as the host, the digital camera and wireless LAN chip are provided, but a personal computer, Bluetooth (registered trademark) device, television or PDA may be used. Additionally, the protocol that controls the file in the third and fourth embodiments may be a protocol other than SMB, FTP and WebDAV. That is, as a command that is encapsulated in a command defined by the SD interface, a command according to an adequate protocol different from the SD interface can be selected.

Further, in the first embodiment, a case wherein one partition is allocated to one host is explained. However, if there is one or more extra partitions, a plurality of partitions may be allocated to one host. In the first embodiment, a case wherein each host is inhibited from writing data but is permitted to read data with respect to a partition other than the allocated partition is explained. However, not only writing but also reading may be inhibited.

Further, the above embodiments can be combined as far as possible and embodied and can be independently embodied as far as possible. In the above embodiments, in the operations explained with reference to the flowcharts, the order of the steps can be changed as far as possible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
   a first interface;
   a wireless communication unit;
   a memory unit including a first region used for first access from the first interface and a second region used for second access from the wireless communication unit; and
   a controller that arbitrates between the first and second accesses to perform the first access to write data to the first region and perform the second access to write data to the second region,
   wherein writing to the second region by the first access and writing to the first region by the second access are inhibited.

2. The device according to claim 1, wherein the first and second regions respectively include tables which manage information in the first and second regions using a file system.

3. The device according to claim 1, wherein the memory unit further includes a third region which holds information indicating that the first and second regions are contained in the memory unit.

4. The device according to claim 1, wherein the controller converts at least one of addresses when the first and second accesses are simultaneously made to the same address.

5. The device according to claim 1, wherein the first and second accesses are made using an SD command encapsulating a protocol which performs file control.

6. The device according to claim 5, wherein the SD command is a CMD 56 in an SD interface standard, and the protocol is at least one of Server Message Block (SMB), File Transfer Protocol (FTP) and Web-based Distributed Authoring and Versioning (WebDAV).

7. The device according to claim 5, wherein the first interface is an SD interface and the file system controller extracts the protocol from the received first and second accesses and issues an instruction to the memory unit according to the protocol.

8. The device according to claim 1, wherein information on the first and second regions is managed by the same table according to the file system.

9. The device according to claim 2, wherein the file system is a file allocation table (FAT) system.

10. A method for controlling a communication device, comprising:
    reading first information indicating that a memory unit includes first and second partitions from a first region of the memory unit;
    causing a first host to read a first table which manages the first partition according to a file system from the first partition based on the first information; and
    causing a second host with a wireless communication function to read a second table which manages the second partition according to a file system from the second partition based on the first information.

11. The method according to claim 10, wherein the first host is perimitted to write data in the first partition and is inhibited from writing data in the second partition, and the second host is permitted to write data in the second partition and is inhibited from writing data in the first partition.

12. A method for controlling a communication device, comprising:
    receiving write access to a first address region in a memory unit from a first host;
    receiving write access to the first address region from a second host with a wireless communication function; and
    changing a write destination from the first address region to a second address region different from the first address region for the write access from at least one of the first and second hosts.

13. The method according to claim 12, wherein information on the first and second address regions are managed by the same table according to a file system.

14. The method according to claim 12, wherein the write accesses from the first and second hosts are made using an SD command encapsulating a protocol which performs file control.

15. The method according to claim 14, wherein the SD command is a CMD 56 in an SD interface standard, and the protocol is at least one of Server Message Block (SMB), File Transfer Protocol (FTP) and Web-based Distributed Authoring and Versioning (WebDAV).

16. The method according to claim 14, wherein the first interface is an SD interface and the file system controller extracts the protocol from the received first and second accesses and issues an instruction to the memory unit according to the protocol.

17. The method according to claim 10, wherein the file system is a FAT system.

18. The method according to claim 13, wherein the file system is a FAT system.

\* \* \* \* \*